United States Patent Office 3,069,327
Patented Dec. 18, 1962

3,069,327
SOYBEAN WHEY PROTEIN-POLYSACCHARIDE COMPLEX
Arthur C. Eldridge, Morton, and Arlo M. Nash and Allan K. Smith, Peoria, Ill., assignors to the United States of America as represented by the Secretary of Agriculture
No Drawing. Filed Sept. 19, 1960, Ser. No. 57,081
4 Claims. (Cl. 195—63)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to novel and highly useful products comprising specific polysaccharide gum complexes of the proteins comprising soybean whey.

Soybean whey is the well known burdensome liquid remaining after the removal of the protein which is isoelectrically precipitated from an aqueous extract of defatted soybean meal. Soybean whey comprises a mixture of dissolved proteinaceous substances including trypsin inhibitor, hemagglutinin, proteases, amylase, and lipoxidase, nonprotein nitrogen compounds, and carbohydrates. Although nearly one-third of the original soybean meal may be recovered as solids from the soybean whey by evaporation, the whey solids comprise protein only to the extent of 8–12 percent, and commercial recovery by evaporation is not practicable despite the fact that this protein is rich in most of the essential amino acids. In present industrial practice there is no attempt to recover the soybean whey proteins, and vast quantities of soybean whey solution are simply discarded into sewage disposal systems where they greatly increase the BOD (biological oxygen demand).

Lipoxidase is a water-soluble enzyme known to be present in defatted soybean meal and in soybean whey (soybean whey contains about 115 lipoxidase units/mg. N, or about 77,200 lipoxidase units per liter when the extraction ratio is 15:1). Commercially it is conventional to admix about 0.5 percent of raw soybean meal with unbleached bread flour in the presence of a trace of an oil comprising unsaturated fatty acids such as linoleic acid. The lipoxidase of the soybean meal forms labile fatty hydroperoxides thereof which in turn oxidize the carotene that is responsible for the yellowness of unbleached wheat flour. Although highly purified lipoxidase may be obtained by the method of Guthrie, U.S. 2,216,174, its price per milligram virtually restricts its use to biochemical investigation. Because of the prior removal of isoelectrically precipitated non-lipoxidase protein, our novel complexes contain about four times as much lipoxidase per milligram of nitrogen present as does commercial soybean meal and flour which contain about 3000–4000 units of lipoxidase per gram. Since our lipoxidase-containing complexes are inexpensive to prepare, the mild bleaching action of lipoxidase may now be extended to other applications where such an action is desired.

Nitrogen determinations of our novel complexes show that they comprise 4.48 to 11.9 percent nitrogen. On the basis of a nitrogen factor of 6.35 it is apparent that our complexes comprise about 30 to 80 percent protein.

A principal object of our invention is the preparation of a valuable product from soybean whey solution. Another object is the removal of substantial amounts of proteinaceous material from soybean whey before disposal, thus reducing the subsequent BOD thereof. A more specific object is the preparation of a lipoxidase-containing product having at least 4 times the lipoxidase activity per milligram of nitrogen as does commercial soybean flour. Other objects will become apparent hereinafter.

The instant invention comprises the discovery that when a small amount of an aqueous solution of a polysaccharide gum such as Irish moss, gum karaya, sodium alginate, alginic acid, or agar is added to defatted soybean meal whey solution, the polysaccharide complexes with the proteinaceous material therein, to form a recoverable precipitate which upon lyophilization (freeze drying), contains the said large values of protein and available lipoxidase.

Table I shows the assay values for the complexes of this invention. The lipoxidase contents were obtained by the spectrophotometric method of Theorell et al., "Methods of Biochemical Analysis," vol. 2, p. 113 (1955), published by Interscience Publ., Inc., New York City.

TABLE I

| Polysaccharide complex | Amt. (gms. in soln.) added/l. of whey | Percent N in complex (dry basis) | L. U. [1]/mg. N in complex | L. U. [1]/gm. of complex | Percent whey protein complexed | Percent lipoxidase complexed |
|---|---|---|---|---|---|---|
| Irish moss extractives | 2.16 | 10.10 | 138.7 | 13,509 | 102 | 105 |
| Do | 2.17 | 9.74 | 129.4 | 13,029 | 103 | 97 |
| Sodium alginate | 1.21 | 11.98 | 187.5 | 22,462 | 63 | 85 |
| Do | 2.02 | 8.23 | 128.4 | 10,559 | 71 | 64 |
| Gum karaya | 6.50 | 5.26 | 204.7 | 10,767 | 66 | 100 |
| "Bacto" agar | 2.40 | 4.48 | 38.5 | 1,724 | 18 | 6 |
| Gum tragacanth | 2.02 | 5.34 | | | 12 | |
| Guar gum | 1.21 | 9.70 | | | 6.6 | |
| Locust bean gum | 2.70 | 8.14 | | | 6.5 | |

[1] Lipoxidase units.

The following examples are presented to further teach the practice of our invention.

*Example 1*

PREPARATION OF SOYBEAN WHEY 400 g. of hexane-extracted untoasted oil-free soybean meal was mechanically stirred for a half hour in 4000 ml. water, the pH being adjusted to 7.4–7.6 with NaOH. The solids were then separated by centrifuging, resuspended in 2000 ml. water, and recentrifuged, the supernatant then being combined with the previous supernatant. The pH of the combined supernatant was lowered to 4.4–4.6 with HCl and the resulting precipitate was removed by centrifugation, leaving 4,700 ml. of soybean whey solution having a lipoxidase activity of 117 units per mg. of nitrogen (77,200 lipoxidase units per liter).

*Example 2*

PREPARATION OF ALGINATE-SOYBEAN WHEY PROTEIN COMPLEX

To 4,700 ml. of soybean whey solution obtained as in Example 1 was added 500 ml. of an aqueous solution containing 5.7 g. of sodium alginate. The solution was mechanically stirred for 2 hours and then allowed to precipitate overnight at room temperature. The solids were separated by centrifugation and then lyophilized to yield 15 g. of dry solids analyzing 11.98 percent nitrogen (equivalent to 76.2 percent protein) and representing 63 percent of the total protein originally present in the soybean whey solution.

*Example 3*

PREPARATION OF IRISH MOSS-SOYBEAN WHEY PROTEIN COMPLEX

To 4,700 ml. of soybean whey solution obtained as in Example 1 was added 400 ml. of an aqueous solution containing 10.2 g. of Irish moss. 30.0 g. of lyophilized complex assaying 10.10 percent nitrogen and representing the recovery of 102 percent of the whey protein was obtained.

*Example 4*

PREPARATION OF ALGINATE-SOYBEAN WHEY PROTEIN COMPLEX

To 4,700 ml. of soybean whey obtained as in Example 1 was added 400 ml. of an aqueous solution containing 9.5 g. of sodium alginate. 23.0 g. of lyophilized complex assaying 8.23 percent nitrogen and representing a 71 per cent recovery of the soybean whey proteins was obtained.

*Example 5*

PREPARATION OF GUM KARAYA SOYBEAN WHEY PROTEIN COMPLEX

To 4,700 ml. of soybean whey obtained as in Example 1 was added 800 ml. of an equeous solution containing 30.6 g. of gum karaya. 38.0 of lyophilized complex assaying 5.26 percent nitrogen and representing a 66 percent recovery of the whey proteins was obtained.

*Example 6*

BLEACHING OF UNBLEACHED WHEAT FLOUR WITH SOYBEAN WHEY-ALGINATE COMPLEX

A bread dough was prepared by intimately mixing 100 g. of unbleached wheat flour with a solution containing 62 ml. water, 0.4 g. soybean-alginate complex, 1.0 linoleic acid, and NaOH (to pH 7.0). After mixing for five minutes in a dough mixer, the mass was incubated at 37° C. for three hours and then freeze dried. The dry material was then ground to a flour, and the residual carotene was measured spectrophotometrically as described in A.O.A.C., 7th ed., p. 206 (1950), published by Association of Official Agricultural Chemists, Washington 4, D.C.

The results show that the original wheat flour contained 1.85 p.p.m. carotene whereas the test product contained only 0.78 p.p.m. carotene, thus showing that our soybean-alginate complex significantly reduces the amount of colored component present in unbleached wheat flour.

Having fully disclosed our invention, we claim:

1. The method which comprises mixing lipoxidase-containing soybean whey with a water solution of a polysaccharide gum and recovering from the reaction mixture a complex of soybean whey proteins and the polysaccharide gum having lipoxidase activity.

2. The method which comprises mixing lipoxidase-containing soybean whey with a water solution of a polysaccharide gum from the group consisting of sodium alginate, Irish moss, gum karaya, and agar and recovering from the reaction mixture a complex of soybean proteins and said polysaccharide gum having lipoxidase activity.

3. A composition having lipoxidase activity comprising a complex of lipoxidase-containing soybean whey proteins and a polysaccharide gum.

4. A composition having lipoxidase activity comprising a complex of lipoxidase-containing soybean whey proteins and a polysaccharide gum from the group consisting of sodium alginate, Irish moss, gum karaya, and agar.

References Cited in the file of this patent

UNITED STATES PATENTS

| | | |
|---|---|---|
| 1,994,922 | Hass et al. | Mar. 19, 1935 |
| 2,430,180 | Gloahec | Nov. 4, 1947 |
| 2,824,092 | Thompson | Feb. 18, 1958 |
| 2,922,749 | Snyder et al. | Jan. 26, 1960 |

OTHER REFERENCES

Markley: "Soybean and Soybean Products" (2 vols.), 1950–51, Interscience Publishers Inc., New York, pages 312, 360, 963.